United States Patent
McClure

(10) Patent No.: US 8,348,253 B2
(45) Date of Patent: Jan. 8, 2013

(54) MODIFIED BOILER WALL TUBE TOOL

(76) Inventor: Mark W. McClure, South Charleston, WV (US)

( * ) Notice: Subject to any disclaimer, the term of this patent is extended or adjusted under 35 U.S.C. 154(b) by 1378 days.

(21) Appl. No.: 11/370,713

(22) Filed: Mar. 8, 2006

(65) Prior Publication Data

US 2007/0210498 A1 Sep. 13, 2007

(51) Int. Cl.
*B25B 1/20* (2006.01)
*B23K 37/053* (2006.01)

(52) U.S. Cl. ........... 269/43; 228/44.5; 228/49.3; 29/272

(58) Field of Classification Search .............. 269/9.3, 269/152, 153, 159, 268–270, 902, 4.3; 228/49.5, 228/49.1, 49.3, 44.5, 49; 248/68.1, 67.5, 248/74.3, 74.4; 29/272, 402.13
See application file for complete search history.

(56) References Cited

U.S. PATENT DOCUMENTS

| | | | | |
|---|---|---|---|---|
| 544,501 | A | * 8/1895 | Buffinton | 248/67.5 |
| 2,367,552 | A | * 1/1945 | Ahrndt | 294/87.1 |
| 2,612,821 | A | 10/1952 | Skay | |
| 2,963,679 | A | * 12/1960 | Jugle | 439/781 |
| 4,846,391 | A | 7/1989 | McClure | |
| 4,936,500 | A | * 6/1990 | McClure | 228/44.5 |
| 4,979,294 | A | 12/1990 | Bowman et al. | |
| 5,044,075 | A | 9/1991 | Brennan | |
| 5,083,372 | A | 1/1992 | Polutnik | |
| 5,481,793 | A | 1/1996 | McClure | |
| 5,893,209 | A | 4/1999 | Weeks | |
| 5,974,642 | A | 11/1999 | Weeks | |
| 6,007,029 | A | 12/1999 | Barriger et al. | |
| 6,182,354 | B1 | 2/2001 | Weeks | |
| 6,308,921 | B1 | 10/2001 | Borzucki | |
| 6,385,841 | B1 | 5/2002 | Weeks | |

OTHER PUBLICATIONS

U.S. Appl. No. 11/370,686 (McClure, Mark), filed Mar. 8, 2006.
U.S. Appl. No. 11/425,537 (McClure, Mark), filed Jun. 2, 2006.

* cited by examiner

*Primary Examiner* — Hadi Shakeri
(74) *Attorney, Agent, or Firm* — Robert R. Waters; Brian W. Foxworthy; Waters Law Group, PLLC

(57) ABSTRACT

A boiler wall tube tool comprises a pair of opposed clamp members, each one of the clamp members having a nose intermediately disposed between a recess and a planar or inclined wall, and an aperture formed centrally through the clamp member. The clamp members oriented so that the recess of one of the clamp members is substantially aligned with the planar wall of the remaining clamp member for engaging a boiler wall tube therebetween. The aperture of one clamp member is substantially aligned with the aperture of the remaining clamp member. Means for moving the clamp members toward each other for secure clamping engagement of the tubes for maintaining the clamp members in alignment while connecting the ends of the tubes by welding is also provided.

17 Claims, 3 Drawing Sheets

MODIFIED BOILER WALL TUBE TOOL

RELATED U.S. APPLICATION DATA

Not applicable.

FIELD OF THE INVENTION

This invention relates generally to a tool for use in securing the ends of a boiler tubes along a boiler wall in aligned relation so that the ends of the tubes may be joined via welding. Specifically, this invention relates to a modified boiler wall tube tool in which boiler tubes in the form of a wall can be clampingly secured to retain adjacent ends of the boiler tubes forming the wall in aligned relation when connection the ends of the boiler wall tubes by welding.

BACKGROUND OF THE INVENTION

Tools for clamping and aligning boiler tubes when connecting the ends of the boiler tubes by welding are known as disclosed in U.S. Pat. Nos. 4,493,139, 4,579,272 and 4,722,468. The devices disclosed in the above-mentioned patents include structures for securing boiler tube ends in aligned and adjacent relation and function effectively when the boiler tubes are in spaced relation. However, in boiler wall tubes, the boiler tubes are positioned in closely spaced relation and are interconnected by webs to form a continuous boiler tube sheet or wall. The tools disclosed in the above-mentioned patents are not especially adapted for use with boiler tubes forming a boiler wall.

In addition, and considered relevant to the present invention, are U.S. Pat. Nos. 4,846,391 and 4,936,500, both issued to Gary McClure, disclosing various embodiments of boiler wall tube tools that clampingly engage the respective tubes to facilitate welding in the repair of a wall tube or tubes. The '391 patent discloses a boiler wall tube tool having a pair of opposed clamp members that includes a pair of recesses to engage adjacent ends of a pair of boiler wall tubes on opposite sides of a juncture between adjacent ends. The tool includes means for moving the clamps toward one another, thereby generating a secure clamp engagement between the clamps onto the respective tube or tubes. Moving means is described as a handle and a mounting bar that is inserted through each of the clamps. The '500 patent is a variation of the '391 patent is some respects, and specifically discloses a boiler wall tube tool that is bolted directly onto the boiler tube wall as opposed to utilizing a handle and mounting bar combination disclosed in '391. However, neither of the Gary McClure patents demonstrate an ability to provide versatility to the user in accommodating varying sizes beyond the dimensions of the recesses provided in the '391 and '500 disclosures. The present invention overcomes this deficiency by providing the user with the ability to use the present invention on variously sized/dimensioned tubes.

Other prior art considered relevant to the present invention includes U.S. Pat. No. 5,481,793 (also issued to Gary McClure), U.S. Pat. No. 2,612,821 (issued to Skay), 6,007,029 (issued to Barringer et al.), U.S. Pat. No. 5,083,372 (issued to Polutnik), U.S. Pat. No. 5,044,075 (issued to Brennan et al.), U.S. Pat. No. 4,979,294 (issued to Bowman et al.), U.S. Pat. No. 6,308,921 (issued to Borzucki), and the group of U.S. Pat. Nos. 5,893,209, 5,974,642, 6,182,354 and U.S. Pat. No. 6,385,841 (all issued to Weeks).

SUMMARY OF THE INVENTION

In one aspect of the present invention, a boiler wall tube tool for clampingly securing adjacent ends of boiler tubes in an aligned and adjacent relationship as the ends are connected by welding is provided in accordance with one embodiment of the present invention. The boiler wall tube tool comprises a pair of opposed clamp members, each one of the clamp members having a nose intermediately disposed between a recess and a planar wall, and an aperture formed centrally through the clamp member. The clamp members oriented so that the recess of one of the clamp members is substantially aligned with the planar wall of the remaining clamp member for engaging a boiler wall tube therebetween. The aperture of one clamp member is substantially aligned with the aperture of the remaining clamp member. Means for moving the clamp members toward each other for secure clamping engagement of the tubes for maintaining the clamp members in alignment while connecting the ends of the tubes by welding is also provided. The combination of a recess and a planar or inclined wall along the same general surface of a clamp member provides the user with greater versatility in accommodating boiler tubes of greater or differing diameters and centering distances between boiler tubes than a device having a single size pair of adjacent recesses.

Each one of the clamp members has means providing access to the periphery of the juncture between the ends of the tube clamped by the clamp members, facilitating ease of use and access to the tubes that are to be welded. The means providing access to the periphery of the juncture between the adjacent ends of the tubes includes a laterally inwardly extending centrally disposed recess in each side edge of each clamp member in alignment with the juncture between the adjacent ends of the pair of tubes thereby providing access to a substantial portion of the periphery of the adjacent ends of the pair of tubes both interiorly and exteriorly of the boiler wall formed by the tubes.

Moving means may comprise a bolt inserted through the clamp members and having a floating nut coupled to the threaded portion of the bolt. The bolt and the nut cooperate to adjust the separation between the clamp members as the nut is turned.

As discussed above, the method and device of the present invention overcomes the disadvantages inherent in prior art methods and devices. In this respect, before explaining at least one embodiment of the invention in detail, it is to be understood that the invention is not limited in its application to the details of construction and to the arrangement of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

Accordingly, those skilled in the art will appreciate that the conception upon which this invention is based may readily be utilized as a basis for the design of other structures, methods, and systems for carrying out the several purposes of the present invention. It is important, therefore, that the claims be regarded as including such equivalent constructions insofar as they do not depart from the spirit of the present invention.

Furthermore, the purpose of the foregoing Abstract is to enable the U.S. Patent and Trademark Office and the public generally, and especially including the practitioners in the art who are not familiar with patent or legal terms or phraseology, to determine quickly from a cursory inspection, the nature and essence of the technical disclosure of the application. The Abstract is neither intended to define the invention of the application, nor is it intended to be limiting to the scope of the invention in any way. It is intended that the application is defined by the claims.

BRIEF DESCRIPTION OF THE DRAWINGS

Additional utility and features of the invention will become more fully apparent to those skilled in the art by reference to the following drawings, which illustrate the primary features of the preferred embodiment and numerous alternative embodiments.

DETAILED DESCRIPTION OF THE PREFERRED EMBODIMENT

The detailed description below is for preferred embodiments and is intended to explain the current invention. It is to be understood that a variety of other arrangements are also possible without departing from the spirit and scope of the invention.

Figure 1:
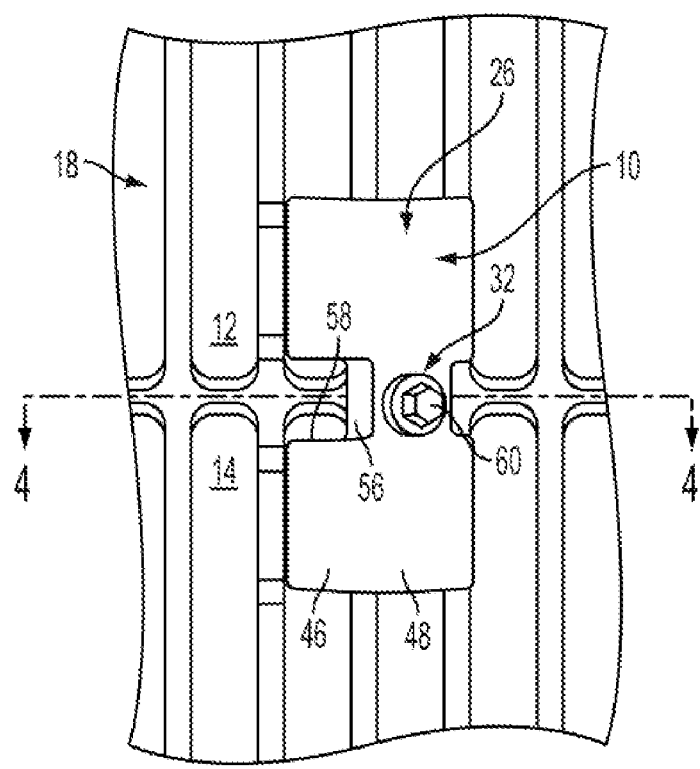
FIG. 1 is a perspective view of a boiler wall structure having a plurality of tubes with a boiler wall tube tool coupled thereto for facilitating welding of boiler tube ends.

Referring now specifically to FIGS. 1 through 4 of the drawings, the bolt-type boiler wall tube tool of the present invention is generally designated by reference numeral 10 and is utilized to clampingly secure adjacent tube ends 12 and 14 of two boiler tubes 16 incorporated into a boiler tube wall generally designated by the numeral 18 in which the tubes 16 are spaced a short distance apart and connected by webs 20 which are continuous throughout the length of the tubes 16. In repair or replacement of the tubes 16, it is necessary to remove tube sections and replace them by welding the adjacent ends 12 and 14 together in a manner well understood in this art. In welding the adjacent ends 12 and 14 together, it is essential that they be securely clamped in aligned relation during the welding operation. The tool 10 of the present invention is utilized for this purpose and, in using the tool, it is necessary to form slots 22 in the webs 20 between adjacent tubes 16 as illustrated in FIG. 1 to receive a component of the tool 10 as described hereinafter.

Figure 3:
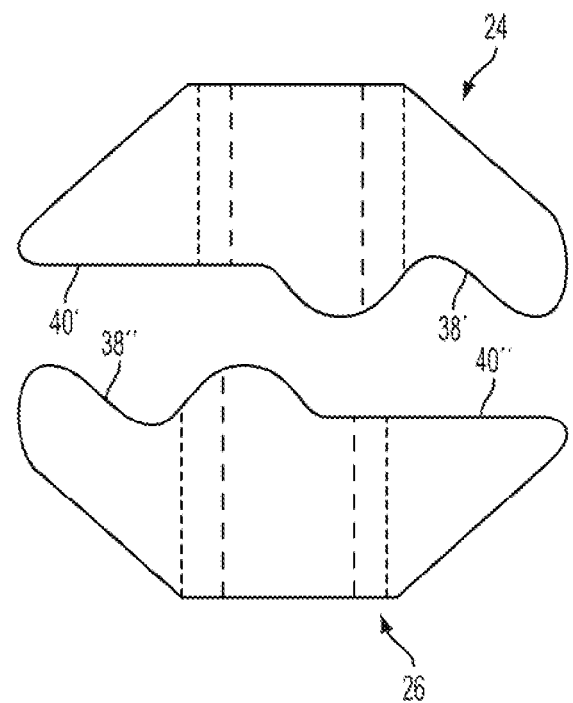
FIG. 3 is a top view of the clamp members.
Figure 5:
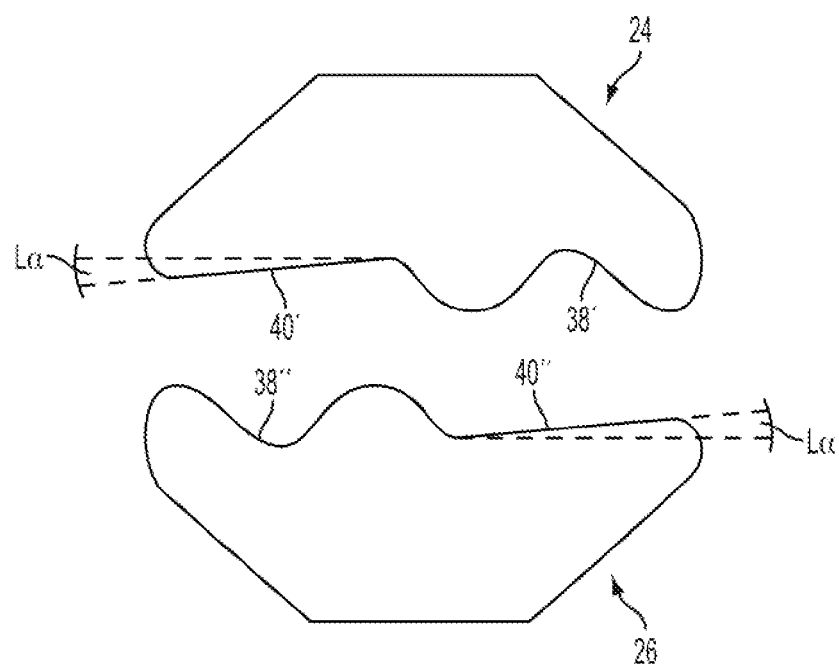
FIG. 5 shows a top view of an alternative embodiment of the invention featuring an inclined planar wall surface.

The tool 10 includes an inner clamp member 24 and an outer clamp member 26 with a clamp bolt 32 adjusting the position of the outer clamp member 26 in relation to the inner clamp member 24. The inner and outer clamp members 24 and 26 are substantially identical and include a substantially rectangular body 34 of rigid construction with the body 34 having a nose 36 intermediately disposed between a recess 38 and a planar wall 40, in which the wall 40 is substantially transversely flat for contacting engagement with the external surface of the tubes 16. Alternatively, the wall 40 may also comprise an incline (as depicted in FIG. 5), which allows for keeping clamp members 24 and 26 in parallel plane in relation to each other in the water wall as larger or smaller diameters tubes in different spaces and sizes are encountered for centering purposes. The inclined wall 40' or 40" may be inclined at an angle $\angle\alpha$ of between greater than 0 degrees (0 degrees corresponding to a planar wall 40) and 12 degrees. The body 34 also includes an aperture 42 formed centrally through the clamp members. As depicted in FIG. 3, the clamp members 24 and 26 are oriented so that the recess 38' of one of the clamp members 24 is substantially aligned with the planar or inclined wall 40" of the remaining clamp member 26 for engaging a boiler wall tube therebetween, and inherently describing the inverse with regard to the planar or inclined wall 40' of one of the clamp members 24 and the recess 38" of the remaining clamping clamp member 26. The aperture 42' of one clamp member 24 is substantially aligned with the aperture 42' of the remaining clamp member 26, the apertures 42' and 42" discussed in greater detail below. The combination of a recess 38 and a planar or inclined wall 40 along the same general surface of a clamp member 24 or 26 provides the user with greater versatility in accommodating boiler tubes of greater or differing diameters than a device having a single size pair of adjacent recesses.

Figure 4:
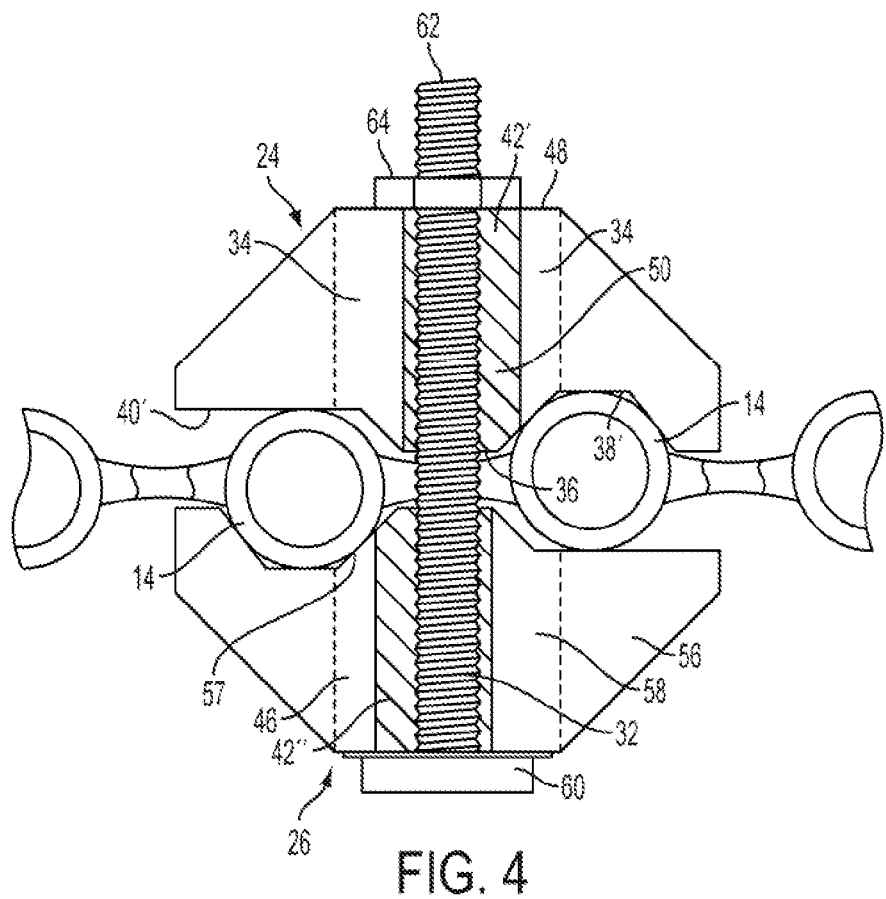
FIG. 4 is a sectional view taken through line III-III of the respective clamp members as coupled to the boiler wall structure

The apertures 42' and 42" have a dimension larger than the clamp bolt 32 so as to accommodate variations in alignment of the clamp members 24 and 26. It is envisioned that the tool 10 can accommodate variously sized boiler tubes. As reflected in FIG. 1, the tool 10 may clampingly secure to the boiler tubes in an expected manner, in which the alignment of a recess 38' with the opposing wall 40" results in the clamp bolt 32 passing through the apertures 42' and 42" in a substantially concentric orientation about an imaginary central axis therethrough. By comparison, and reflected in FIG. 4, the tool 10 may clampingly secure to larger diameter boiler tubes so that the apertures 42' and 42" are not perfectly and concentrically aligned about the imaginary central axis passing through the apertures 42' and 42". However, the diameter of the apertures 42' and 42" is such that only a significant offset will result in the clamp members 24 and 26 not being coupled by and about the clamp bolt 32. As illustrated in FIG. 4, the apertures 42' and 42", though offset, provide sufficient space through which the clamp bolt 32 may be inserted for coupling the clamp members 24 and 26.

Figure 2:
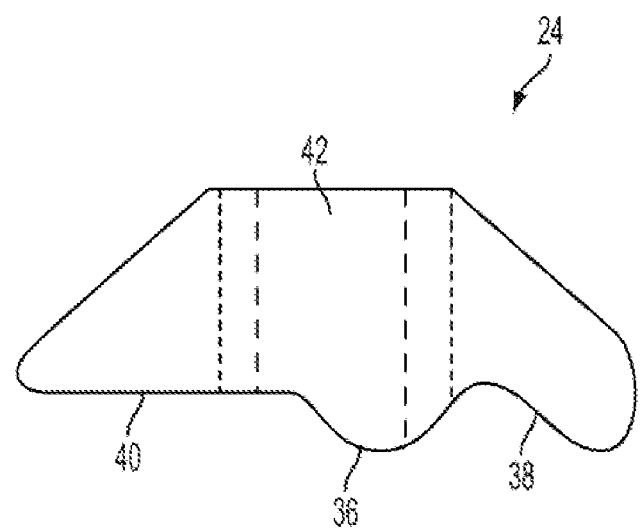
FIG. 2 is a top view of one of the clamp members comprising the boiler wall tube tool.

Inclined outer surfaces 46 which terminate in an outer flat surface 48 in parallel opposed relation to an internal flat surface 50 (the interior surface of the nose 36) which extends between the edges of the inner ends of the inclined surfaces 40 as illustrated in FIG. 2. With this construction, the central portion of the clamp members 24 and 26 are at least as thick as the edge portions and engage adjacent tubes 16.

One end of each of the clamp members 24 and 26 engages ends 12 of two tubes 16 and the other end portion of the clamp members 24 and 26 engage the ends 14 of two tubes 16. When the clamp members 24 and 26 are moved towards each other, the tube ends 12 and 14 will be securely clamped in aligned and adjacent relation.

Each end portion of each of the clamp members 24 and 26 is provided with a recess 54 which extends from the outer curved edges 44 inwardly to a wall 55 that is perpendicular to the inner flat surface of recess 38. The end surfaces defining the recess 54 are parallel to each other and perpendicular to the longitudinal axis of each of the clamp members 24 and 26. As indicated, the recesses 54 are adjacent the ends of the clamp members and include inclined surfaces 57 which cooperate with inclined surfaces 40 to center the tube ends 12 and 14 illustrated in FIG. 2.

The central portion of each clamp member 24 and 26 is also provided with opposite recesses 58 in which the inner walls 56 forming the recesses 58 merge with the inclined surfaces 57 of the respective recesses 38' and 38", and are spaced inwardly from the walls 55 as illustrated in FIG. 4. The recesses 58 provide access to the juncture 52 between the tube ends 12 and 14 to enable the tube ends to be welded.

Means for moving the clamp members 24 and 26 toward each other for secure clamping engagement of the tubes for maintaining the clamp members 24 and 26 in alignment while connecting the ends of the tubes by welding is provided. In one embodiment, means comprises a clamp bolt 32 that includes a head 60 and a threaded portion 62 which is inserted through apertures 42' and 42" of clamp members 24 and 26, respectively. A floating nut 64 is coupled to the threaded portion of the bolt 32 to adjust the separation between the clamp members 24 and 26. As illustrated in FIG. 1, a power wrench such as an air wrench 68 may be used to tighten and loosen the bolt 32. Tightening and loosening the bolt 32 adjusts the separation between the clamp members 24 and 26, respectively, so that tightening the bolt 32 reduces the separation (or distance) between the clamp members 24 and 26, and loosening the bolt 32 increases the separation (or distance) between the clamp members 24 and 26. In another embodiment, it is envisioned that means may comprise a pivotal handle connected to a mounting member which interconnects the two clamp members 24 and 26. An adjustable cam structure adjusts the position of the mounting member in relation to the inner clamp member 24.

When removing and replacing a section of boiler wall tubing, the webs 20 between adjacent tubes 16 are slotted or removed in the adjacent ends 12 and 14 of the tubes 16 to be connected. This enables the clamp member 24 to be positioned against the interior of the boiler tube wall 18 with adjacent ends 12 and 14 received in the recesses 36 and 38. The outer clamp member 26 may then be positioned against the exterior of the boiler tube wall 18 with the bolt 32 extending through the slot or slots 22 and screw threaded through the inner clamp member 24 to clamp the clamp members in place thereby rigidly and securely clamping the adjacent ends 12 and 14 of the tube or tubes 16 in aligned relation with the recesses 54 providing access to the juncture 52 for connecting the tube ends by welding. After initial welding has been obtained, the tool can be removed and the welding connection being completed in a well-known manner.

What is claimed is:

1. A boiler wall tube tool comprising:
  a pair of opposed clamp members, each one of the clamp members having a nose intermediately disposed between a recess and a planar wall, and an aperture formed centrally through the clamp member;
  the clamp members oriented so that the recess of one of the clamp members is substantially aligned with the planar wall of the remaining clamp member for engaging a boiler wall tube therebetween, and the aperture of one clamp member is substantially aligned with the aperture of the remaining clamp member; and
  means for moving the clamp members toward each other for secure clamping engagement of the tubes for maintaining the clamp members in alignment while connecting the ends of the tubes by welding.

2. The tool of claim 1, wherein each one of the clamp members has means providing access to the periphery of the juncture between the ends of the tube clamped by the clamp members.

3. The tool of claim 2, wherein said means providing access to the periphery of the juncture between the adjacent ends of the tubes includes a laterally inwardly extending centrally disposed recess in each side edge of each clamp member in alignment with the juncture between the adjacent ends of the pair of tubes thereby providing access to a substantial portion of the periphery of the adjacent ends of the pair of tubes both interiorly and exteriorly of the boiler wall formed by the tubes.

4. The tool of claim 1, wherein moving means comprises a bolt inserted through the clamp members and having a floating nut coupled to the threaded portion of the bolt.

5. The tool of claim 4, wherein the bolt and the nut cooperate to adjust the separation between the clamp members as the nut is turned.

6. A boiler wall tube tool comprising:
  a pair of opposed clamp members, each one of the clamp members having a nose intermediately disposed between a recess and an inclined wall, and an aperture formed centrally through the clamp member;
  the clamp members oriented so that the recess of one of the clamp members is substantially aligned with the inclined wall of the remaining clamp member for engaging a boiler wall tube therebetween, and the aperture of one clamp member is substantially aligned with the aperture of the remaining clamp member; and
  means for moving the clamp members toward each other for secure clamping engagement of the tubes for maintaining the clamp members in alignment while connecting the ends of the tubes by welding.

7. The tool of claim 6, wherein each one of the clamp members has means providing access to the periphery of the juncture between the ends of the tube clamped by the clamp members.

8. The tool of claim 7, wherein said means providing access to the periphery of the juncture between the adjacent ends of the tubes includes a laterally inwardly extending centrally disposed recess in each side edge of each clamp member in alignment with the juncture between the adjacent ends of the pair of tubes thereby providing access to a substantial portion of the periphery of the adjacent ends of the pair of tubes both interiorly and exteriorly of the boiler wall formed by the tubes.

9. The tool of claim 6, wherein moving means comprises a bolt inserted through the clamp members and having a floating nut coupled to the threaded portion of the bolt.

10. The tool of claim 9, wherein the bolt and the nut cooperate to adjust the separation between the clamp members as the nut is turned.

11. In combination with a boiler tube wall formed by a plurality of closely spaced tubes rigidly connected by webs, a tool for clampingly engaging adjacent ends of a tube from which the connecting webs have been removed and retaining the adjacent tube ends in alignment while being connected by welding, said tool comprising:
  a first clamp member and an opposing second clamp member, each one of the clamp members having a nose intermediately disposed between recess means and wall means, and an aperture formed centrally through the clamp member;
  the clamp members oriented so that recess means or wall means of a first clamp member is aligned with walls means or recess means of a second clamp member so that at least one boiler wall tube is engaged between one of the recess means and one of the wall means; and
  means for moving the clamp members toward each other for secure clamping engagement of the tubes for maintaining the clamp members in alignment while connecting the ends of the tubes by welding.

12. The tool of claim 11, wherein each one of the clamp members has means providing access to the periphery of the juncture between the ends of the tube clamped by the clamp members.

13. The tool of claim 12, wherein said means providing access to the periphery of the juncture between the adjacent ends of the tubes includes a laterally inwardly extending centrally disposed recess in each side edge of each clamp member in alignment with the juncture between the adjacent ends of the pair of tubes thereby providing access to a substantial portion of the periphery of the adjacent ends of the pair of tubes both interiorly and exteriorly of the boiler wall formed by the tubes.

14. The tool of claim 11, wherein moving means comprises a bolt inserted through the clamp members and having a floating nut coupled to the threaded portion of the bolt.

15. The tool of claim 14, wherein the bolt and the nut cooperate to adjust the separation between the clamp members as the nut is turned.

16. The tool of claim 11, wherein the wall means comprises a substantially planar wall.

17. The tool of claim 11, wherein the wall means comprises an inclined wall.

\* \* \* \* \*